United States Patent
Kim et al.

(10) Patent No.: US 9,141,796 B2
(45) Date of Patent: Sep. 22, 2015

(54) SYSTEM AND METHOD FOR DETECTING MALWARE IN FILE BASED ON GENETIC MAP OF FILE

(75) Inventors: Jeong Hun Kim, Seoul (KR); Kyu Beom Hwang, Gyeonggi-do (KR)

(73) Assignee: AHNLAB, INC., Gyeonggi-Do (KR)

( * ) Notice: Subject to any disclaimer, the term of this patent is extended or adjusted under 35 U.S.C. 154(b) by 43 days.

(21) Appl. No.: 13/977,250

(22) PCT Filed: Dec. 27, 2011

(86) PCT No.: PCT/KR2011/010141
§ 371 (c)(1),
(2), (4) Date: Jun. 28, 2013

(87) PCT Pub. No.: WO2012/091400
PCT Pub. Date: Jul. 5, 2012

(65) Prior Publication Data
US 2013/0283382 A1     Oct. 24, 2013

(30) Foreign Application Priority Data
Dec. 31, 2010   (KR) .................. 10-2010-0140175

(51) Int. Cl.
*G06F 21/00*   (2013.01)
*G06F 21/56*   (2013.01)

(52) U.S. Cl.
CPC .............. *G06F 21/56* (2013.01); *G06F 21/562* (2013.01)

(58) Field of Classification Search
CPC ...................................................... G06F 21/56
USPC ............................................................. 726/23
See application file for complete search history.

(56) References Cited

U.S. PATENT DOCUMENTS

| | | | |
|---|---|---|---|
| 2003/0177394 A1* | 9/2003 | Dozortsev ..................... | 713/201 |
| 2004/0181677 A1 | 9/2004 | Hong et al. | |
| 2006/0294592 A1* | 12/2006 | Polyakov et al. ............... | 726/24 |
| 2008/0005796 A1* | 1/2008 | Godwood et al. .............. | 726/24 |
| 2008/0201779 A1* | 8/2008 | Tahan et al. ................... | 726/23 |
| 2009/0024555 A1* | 1/2009 | Rieck et al. .................... | 706/54 |

FOREIGN PATENT DOCUMENTS

| | | |
|---|---|---|
| JP | 2005148814 | 6/2005 |
| KR | 1020040080844 | 9/2004 |
| KR | 20070104761 | 10/2007 |
| KR | 100960117 | 5/2010 |

OTHER PUBLICATIONS

Kinable, Joris. "Malware Detection Through Call Graphs." (2010).*
"Ahnlab development of new technology for malicious code DNA scan," Ahnlab News (URL: http://blog.ahnlab.com/ahnlab/trackback/964), Oct. 8, 2010.

* cited by examiner

*Primary Examiner* — Syed Zaidi
(74) *Attorney, Agent, or Firm* — Bacon & Thomas, PLLC

(57) ABSTRACT

A method for detecting whether a file includes malware is performed on a device. The method includes extracting information of at least two predetermined items in the file; creating a genetic map for the file by altering the extracted information into a previously set format; comparing the created genetic map with a previously stored malware genetic map to obtain a similarity between the created genetic map and the previously stored malware genetic map; and determining that the file is a malware when the similarity is higher than a reference value.

9 Claims, 4 Drawing Sheets

SYSTEM AND METHOD FOR DETECTING MALWARE IN FILE BASED ON GENETIC MAP OF FILE

TECHNICAL FIELD

The present invention relates to system and method for detecting the existence of malware in a file, and more particularly to system and method for determining whether a file includes malware on the basis of a genetic map which can be equally applied to several files.

BACKGROUND ART

Malware is the malicious software. Generally, such malware is infiltrated into a computer by being as a file. The infiltrated malware causes a malfunction of the computer by disturbing computer operations, or functions as an information leakage path allowing the personal information of a user to be externally leaked from the computer. As such, it is necessary to delete or modify a file after an inspection for determining whether the file is malware, in order to prevent the damage caused by the malware.

Conventionally, a signature is used to detect malware or determine whether an inspection target file is malware. More particularly, a value, such as a hash value or CRC (Cyclic Redundancy Check) value, representing characteristics of a file is derived from a part of the file which has been known as malware and is stored in a data base. If a target file to be inspected about infection with malware is received, a signature is derived from the target file in the same way as the above and is compared with the previously derived signatures of files including the malware, thereby determining whether the target file is malware.

DISCLOSURE OF INVENTION

Technical Problem

However, such a method using the signature forces the result of the determination to be varied according to how to generate the signature for the target file. In other words, a value of the signature depends on where the signature is derived within the target file. If the signature is derived from a wrong portion of the target file, the determination can be inaccurate regarding whether the target file is malware. More specifically, positions of codes of a file may be shifted when new code is inserted into the file, so it is difficult to select an exact portion of the file which would be used for creating the signature. Due to this, a detection accuracy of the malware cannot be uniformly maintained.

Further, since the signature is one of items representing characteristics of a file, it is difficult to detect every kind of malware using only the signature. Actually, a plurality of mutations derived from a kind of malware may occur. In this case, the plurality of mutations derived from the malware may not be detected even through the comparison of the signature.

Undetected malware can cause considerable damage to society, because computers are used in every field of society including private individuals, enterprises, public institutions and so on. As such, it is necessary to develop malware detection techniques capable of mitigating deficiencies of the conventional detection method using the signature, uniformly maintaining high detection accuracy, and detecting the plurality of mutated malware.

Solution to Problem

In view of the above, the present invention provides a malware detection system and method that are adaptable to uniformly maintain high detection accuracy and detect a plurality of mutated malware.

In accordance with a first embodiment of the invention, there is provided that a method performed on a device for detecting whether a file includes malware, the method comprising: extracting static information of at least two predetermined items in the file; creating a genetic map for the file by altering the extracted information into a previously set format; comparing the created genetic map with a previously stored malware genetic map to obtain a similarity between the created genetic map and the previously stored malware genetic map; and determining that the file includes malware when the similarity is higher than a reference value.

In accordance with a second embodiment of the invention, there is provided a method performed on a device for detecting whether a file includes a malware, the method comprising: extracting information of at least two predetermined items in the file; creating a genetic map for the file by altering the extracted information into a previously set format; deriving a signature from the created genetic map of the file; comparing the derived signature with a malware signature; and determining the file to include malware when the derived signature is substantially identical to the malware signature.

In accordance with a third embodiment of the invention, there is provided a system for detecting whether a file includes malware, the system comprising: an information extractor for extracting information of at least two predetermined items in the file; a genetic map generator for creating a genetic map of the file by altering the extracted information into a previously set format; and a comparator for comparing the created genetic map with a previously stored malware genetic map to obtain a similarity between the created genetic map and the previously stored malware map and determining the file to include malware when the similarity is higher than a reference value.

In accordance with a fourth embodiment of the invention, there is provided a system for detecting whether a file includes malware, the system comprising: an information extractor for extracting information about at least two predetermined items in the file; a genetic map generator for creating a genetic map for the file by altering the extracted information into a previously set format; a signature generator for deriving a signature from the created genetic map of the file; a comparator for comparing the derived signature with a malware signature and determining the file to include malware when two signatures are substantially identical.

Advantageous Effects of Invention

The malware detection method and system in accordance with the embodiments of the present invention can consider all the characteristics of a file in the detection of malware by using the genetic map. As such, the detection accuracy of the malware is rarely affected when any one among the characteristics of the file is varied. Therefore, a high detection accuracy of the malware can be maintained. Also, a plurality of mutated malware can be detected.

Moreover, the genetic map is uniformly created regardless of the characteristics of the file. As such, the genetic map is rarely affected with the configuration and content of the file. Accordingly, the malware detection can be systematically and uniformly executed.

While the invention has been shown and described with respect to the embodiments, it will be understood by those skilled in the art that various changes and modifications may be made without departing from the scope of the invention as defined in the following claims.

BRIEF DESCRIPTION OF DRAWINGS

The above and other objects and features of the present invention will become apparent from the following description of exemplary embodiments given in conjunction with the accompanying drawings, in which.

BEST MODE FOR CARRYING OUT THE INVENTION

Hereinafter, embodiments of the present invention will be described in detail with reference to the accompanying drawings.

Figure 1:
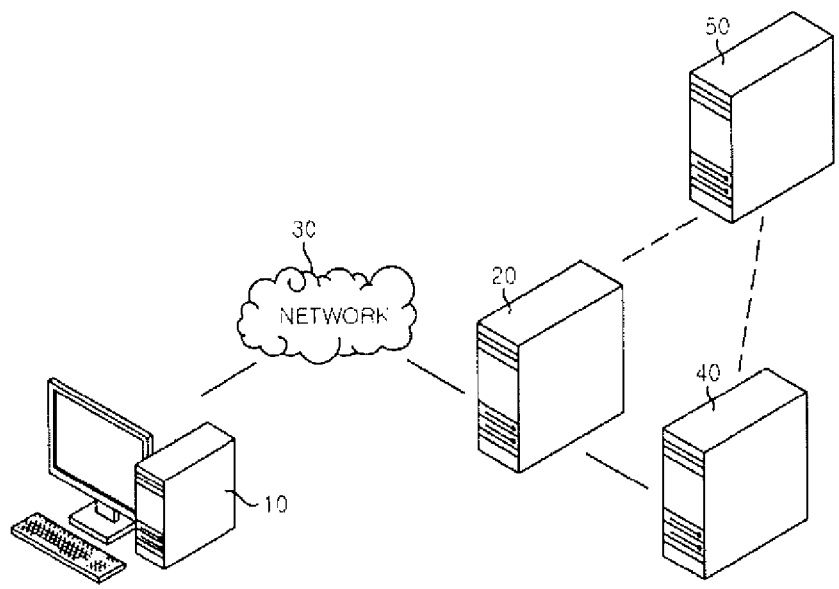
FIG. 1 is a schematic diagram showing a configuration of a malware detection system in accordance with the present invention.

FIG. 1 is a schematic diagram showing the configuration of a malware detection system in accordance with the present invention. The malware detection system of the present invention includes a client device 10 and an analysis device 20.

The client device 10 is a system configured to execute at least one program file. Actually, the client device 10 may be any one of a PC (Personal Computer), a PDA (Personal Digital Assistant), a smart phone, a server computer, and a variety of devices, which are configured to execute at least one program file. The client device 10 can be connected to the analysis device 20 through a network 30.

The analysis device 20 receives files and determines whether the received files are infected with malware. To this end, the analysis device 20 may include at least one computer system. In other words, the analysis device 20 may include a combination of at least two computer systems or a single computer system. The analysis device 20 generates a genetic map for each of the received files and compares the generated genetic map with genetic maps of the malware (hereinafter, "malicious genetic maps") and/or genetic maps of normal files (hereinafter, "whitelist genetic maps"), which have been previously stored in a database 40, in order to determine whether the received files are infected with malware. If it is determined that a certain file of the received files is determined to be infected with malware, the analysis device 20 designates the generated genetic map for the certain file as a malicious genetic map and stores the newly designated malicious genetic map in the database 40 so that the newly designated malicious genetic map can be used in the determination of malware later. Also, if it is determined that another file of the received files is a normal file, the analysis device 20 designates the generated genetic map for another file as a whitelist genetic map and stores the newly designated whitelist genetic map in the database 40 so that the newly designated whitelist genetic map can also be used in the determination of malware later.

Also, in a case that the malicious genetic map and/or the whitelist genetic map are newly designated, the analysis device 20 can transmit information about the newly designated malicious genetic map and/or whitelist genetic map to the client device 10. For example, the analysis device 20 can derive a signature, such as a hash value or a CRC value, from the newly designated malicious genetic map and/or whitelist genetic map and transmit the derived signature to the client device 10. This transmission of the signature can be executed either every fixed interval or whenever the new malicious or whitelist genetic map is designated. Alternatively, the derivation and transmission of the signature can be executed by a separate computer system 50 instead of the analysis device 20. As an example of the separate computer system 50, a separated update server can be employed which periodically searches the database 40, derives the signatures from the malicious genetic maps and/or the whitelist genetic maps, which are stored in the database 40, and transmits the derived signatures to the client device 10. As another example of the separate computer system 50, a separate device being notified of the detection of malware from the analysis device 20 can be employed which recognizes the existence of malware on the basis of the notice from the analysis device 20, creates the signatures, and transmits the derived signatures to the client device 10.

The client device 10 can also generates a genetic map for a received file and determine whether the file includes malware based on the generated genetic map and information about the malware, such as a signature, which is received from the analysis device 20. Moreover, when it is determined that the received file includes the malware, the client device 10 transmits information about the detected malware to the analysis device 20 so that the information about the detected malware is updated in the database 40 by the analysis device 20.

The genetic map of a file corresponds to an information aggregation which includes information of at least two predetermined items within a file. The items can be previously selected to include the information capable of representing characteristics of the file, but the items are not varied in kind and number even though the characteristics of files are different. The information of the same items can be derived from each of several files and the genetic maps can be created based on the derived information. Although the information of any one of the predetermined items for a specific file does not either exist or does not relate with the characteristics of the specific file, the information of all the selected items is included in the genetic map. In other words, if the information of one of the predetermined items does not exist in the specific file, information representing non-existence thereof is included in the genetic map. As such, all the predetermined items included in the genetic map can be always maintained in kind and number. The use of the genetic map enables the number of items being used for determining the similarity of a file to be increased compared to the conventional method which uses the signature. Moreover, although the information of any one of the selected items is modified, the use of the genetic map allows the determination accuracy to be uniformly maintained because the information of others of the predetermined items is further considered. The creation and use of the genetic information in association with embodiments of the present invention will be described in detail later.

Figure 2:
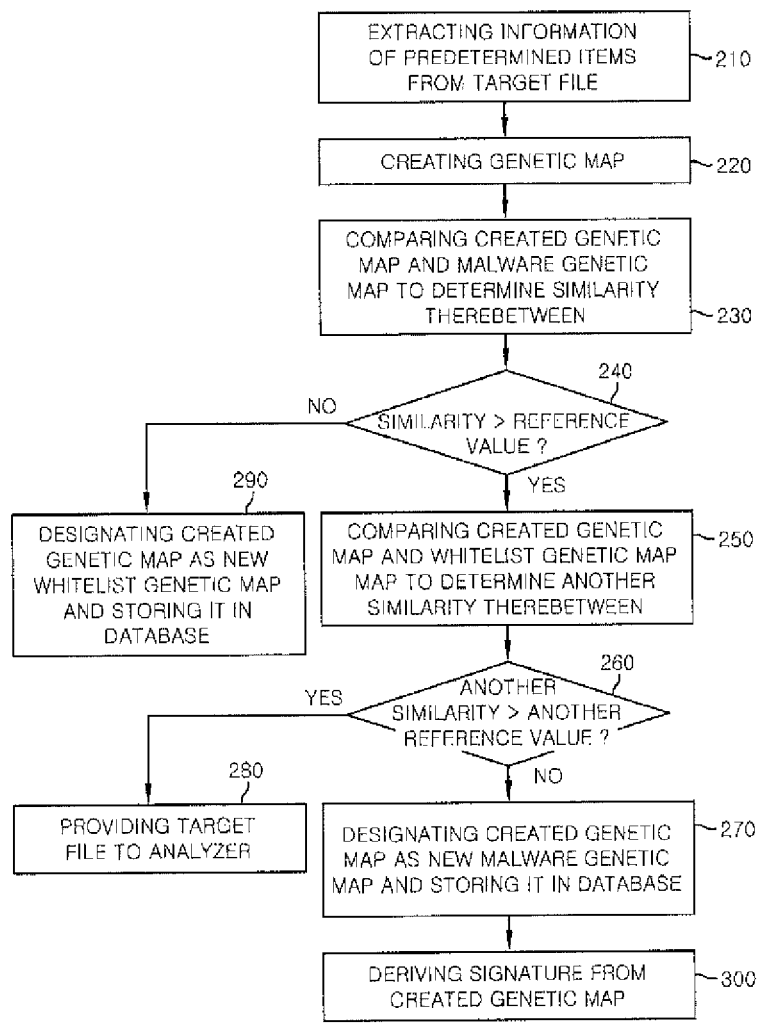
FIG. 2 is a flow chart illustrating a malware detection method in accordance with the first embodiment of the present invention.

FIG. 2 is a flow chart illustrating a malware detection method in accordance with the first embodiment of the present invention. The method of FIG. 2 may be executed by the analysis device 20 illustrated in FIG. 1, for an example.

The malware detection method in accordance with the first embodiment of the present invention extracts information of predetermined items from an inspection target file at step 210. The predetermined items for the extraction are consistent without being varied along a kind of the target file. The predetermined items may include at least one among header field, a source field, a downloaded position field, mother file field, entropy about a block, and a CRC value for a block of the target file. Some information, such as entropy and CRC value, requiring a code calculation can be extracted from a specific block which has been previously selected in a file, in order to promote efficiency.

At a next step 220, the extracted information changes in a previously set format, in order to create a genetic map for the target file. For instance, the genetic map can be created by arranging the extracted information along a previously set bit-map. In other words, the genetic map can be created by previously determining a bit-map range for each of the extracted information and arranging based on the determination. Therefore, every device accessing the genetic map can read desired information by selecting a corresponding bit-map range.

More specifically, the predetermined items within the genetic map may include a branch distance which is included in a branch instruction within the target file. For example, a JMP instruction in assembly language, a CALL instruction and a conditional branch instruction, which are used for designating distances to memory addresses to be shifted, can be extracted from the target file and included in the genetic map. In this case, when branch distances extracted from the target file number at least two, a logical sum or an arithmetic sum of the branch distances can be used as branch distance information. The branch distance information is rarely varied even though a code is modified. This results from the fact that the branch distance information affects basic structure of a program configuration. Actually, the program configuration would be entirely changed when the branch distance information is varied.

As such, the genetic map including the branch distance information makes it possible to accurately determine not only the existence of malware but also a mutation thereof. Also, a determination for a similarity between files can be efficiently and rapidly performed by considering the numerically standardized branch distance instead of the entire configuration of the program. Moreover, since the determination for the similarity between the files is mechanically performed, it can prevent the determination from being different in accordance with the ability of an analyzer.

Thereafter, the created genetic map for the target file is compared with respective malware genetic maps which were previously stored in the data base 40, at a step 230. For example, a similarity between the created genetic map and the malware genetic map can be determined based on the number of items of the created genetic map whose information values are identical to those of corresponding items of the malware genetic map. Alternatively, each of the items in the genetic map can have a weight value different from one another. In this case, a similarity between the two genetic maps depends upon a sum of the weight values for the items of the created genetic map whose information values are identical to those of corresponding items of the malware genetic map. In this manner, a mutated item or an error in an item very rarely affects the entire similarity determination because the similarity determination depends on a plurality of items. Therefore, the accuracy of the similarity determination can be constantly maintained.

Subsequently, the determined similarity is compared with a reference value at a step 240. The reference value can be predetermined by an analyzer. If the determined similarity is higher than the reference value, the target file is determined to be malware and then, a step 270 of the malware designation which will be explained later is performed.

On the other hand, steps 250 and 260 can be performed before the step 270 in order to prevent mistakes in determining the malware. At the step 250, the created genetic map is compared with respective whitelist genetic maps which were previously stored in the data base 40, thereby obtaining another similarity between the two genetic maps. Next, another similarity obtained through the comparison between the created genetic map and a whitelist genetic map is compared with another reference value at the step 260. When another similarity is less than another reference value, the target file is definitely determined to be malware and then, the step 270 is performed. Another reference value can be predetermined by the analyzer. On the contrary, if another similarity is higher than another reference value, an additional procedure is necessary for the target file because the target file is similar to not only the normal file but also the malware. To this end, a step 280 of providing the target file to the analyzer for an analyzer's determination may be performed.

The above-mentioned steps 250, 260 and 280 are performed for preventing a normal file from being mistakenly identified as malware. As such, the steps 250, 260 and 280 can be removed from the malware detection method in accordance with the first embodiment of the present invention.

Next, the created genetic map is designated as a new genetic map of the malware and stored in the data base, at the step 270. As such, the newly stored malware genetic map can also be used for detecting malware thereafter. In this way, the genetic maps of the malware can be continuously updated and accumulated in the database 40. Accordingly, the accuracy for the determination of malware can be enhanced.

Going back to the step 240, on the contrary, when the calculated similarity between the created genetic map and the malware genetic map is lower than the reference value, the file is determined to include normal codes and then, a step 290 of the normal file designation is performed. At the step 290, the created genetic map can be designated as a new genetic map of a normal file and stored in the data base 40.

Alternatively, the above-mentioned steps 250 and 260 can be further performed before the step 290, in order to enhance the accuracy of determining whether the file includes only the normal codes. More specifically, the created genetic map of the target file is compared with a genetic map of the normal file, thereby obtaining another similarity between the created genetic map and the whitelist genetic map. Subsequently, another similarity is compared with another reference value. Only when another similarity is higher than another reference value, the target file is definitively determined to include the normal codes and then, the step 290 is performed which allows the created genetic map to be designated as a new whitelist genetic map and to be stored in the data base 40.

At a step 300, a signature is derived from the created genetic map of the target file which is determined to be the malware. The signature may include a hash value or a CRC value. The derived signature can be transmitted to an external device, such as a client device, and be used by the external device for determining whether the file includes malware. The malware detection method using the signature shows higher effectiveness than that including the process of comparing the genetic maps entirely. Therefore, the malware detection method using the signature can be effectively used in a device, such as a personal computer, that does not have enough resources.

Figure 3:
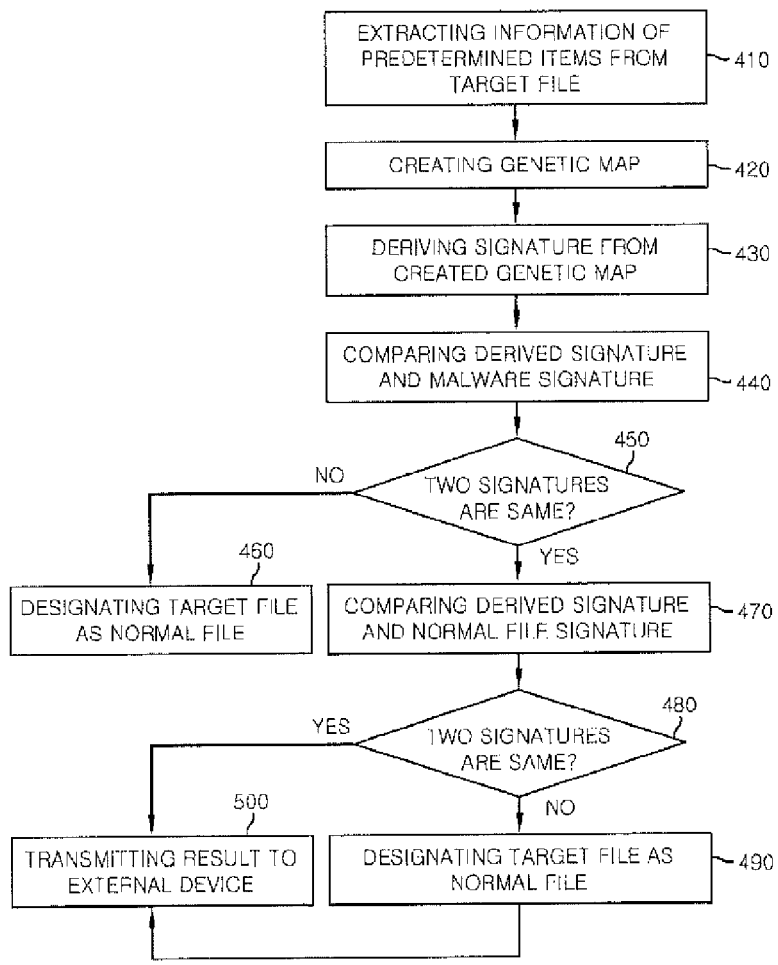
FIG. 3 is a flow chart illustrating a malware detection method in accordance with the second embodiment of the present invention.

FIG. 3 is a flow chart illustrating a malware detection method in accordance with the second embodiment of the present invention. The method of FIG. 3 may be executed by the client device 10 illustrated in FIG. 1, as an example.

The malware detection method in accordance with the second embodiment of the present invention extracts information of at least two items, which are previously determined, from an inspection target file at a step 410. For example, the client device 10 extracts the information of the predetermined items from the inspection target file received from a network. Continuously, the extracted information changes in a previously set format, thereby creating a genetic map for the received target file. The detailed description for the information extraction process and the created genetic map will be omitted to avoid overlapping with the description associated with the first embodiment of FIG. 2.

Thereafter, a signature is derived from the created genetic map of the target file at a step 430. For instance, a hash value or a CRC value can be derived from the created genetic map which has a serial combined configuration of the information, through a calculation process, and be used as a signature. The derived signature is compared to at least one malware signature in order to, at a step 440. The malware signature may be obtained by receiving the malware signatures prepared through the method which is described referring to FIG. 2. Alternatively, the malware signature can be received from the data base by connecting the client device 10 to the data base 40. The comparison of signatures instead of the genetic maps can reduce comparison and operation loads and resource consumption.

At a step 450, it is determined whether two signatures are substantially identical. If two signatures are not identical, the target file may be determined to include only normal code and then, a step 460 of a normal file designation is performed. At the step 460, the target file is designated as a normal file and information about the normal file may be stored in the client device 10 or be transmitted to an external device, such as the analysis device 20 or the data base 40, regularly.

On the contrary, when it is determined that the derived signature is substantially identical to the malware signature, a step 470 may be performed in which the derived signature is compared to at least one normal file signature. Subsequently, another determination of whether the derived signature is substantially identical to at least one normal file signature is performed at a step 480. If the result of the step 480 indicates that the derived signature is not identical to all of the normal file signatures, the received target file is determined to include malware and then, a step 490 of a malware designation is performed. At the step 490, the target file is designated as malware. Also, the newly designated malware together with the derived signature may be transmitted from the client device 10 to the analysis device 20 at a step 500. At this time, the analysis device 20 updates the data base 40 using the information received from the client device 10. Alternatively, the step 500 can be omitted. In other words, the client device 10 cannot transmit the newly designated malware and the derived signature to the analysis device 20. In this case, the analysis device 20 can update the data base 40 without receiving any information from the client device 10 by its own operation.

On the other hand, if it is determined that the derived signature is substantially identical to at least one normal file signature, the client device 10 can not determine whether the target file includes malware or only normal code. In this case, the client device 10 enters a step 500 and transmits information about the target file to the analysis device 20. Then, the analysis device 20 can perform the malware detection method of FIG. 2 for the target file corresponding to the received information, or provide an analyzer with the file corresponding to the received information, in order to obtain an accurate determination result for the target file.

Although the malware detection method of the second embodiment illustrated in FIG. 3 is preferably executed in the client device 10, the method of FIG. 3 can be executed in the analysis device 20 for easy malware detection. Similarly, the malware detection method of the first embodiment illustrated in FIG. 2 can also be executed in the client device 10.

Figure 4:
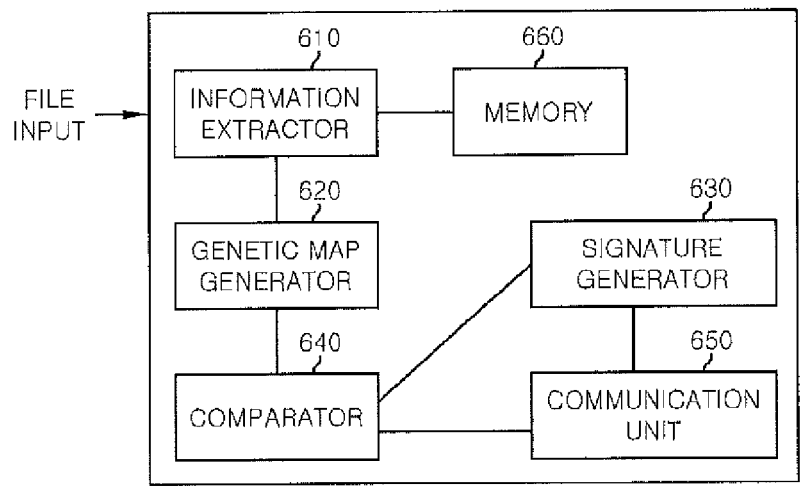
FIG. 4 is a block diagram showing a malware detection system in accordance with the third embodiment of the present invention.

FIG. 4 is a block diagram showing a malware detection system in accordance with the third embodiment of the present invention. The system of FIG. 4 may be performed on the analysis device 20 shown in FIG. 1.

The malware detection system in accordance with the third embodiment of the present invention may include an information extractor 610, a genetic map generator 620, a signature generator 630, a comparator 640, a communication unit 650 and a memory 660.

The information extractor 610 receives an inspection target file and derives information of predetermined items from the target file. Details of the predetermined items may be stored in the memory 660. As such, the information extractor 610 can extracts the information of the predetermined items using the details stored in the memory 660. Alternatively, a code describing the predetermined items may be stored in an internal memory of the extractor 610. In this case, the information extractor 610 can execute the code stored in its internal memory and extract the information of the predetermined items from the target file.

The genetic map generator 620 receives the information extracted by the information extractor 610 and changes the extracted information in a previously set format, thereby creating a genetic map. For example, the genetic map generator 620 can create the genetic map by arranging the extracted information along a previously set bit-map.

The comparator 640 compares the genetic map created by the genetic map generator 620 with at least one malware genetic map. The malware genetic map can be received from a data base via the communication unit 650. The comparator 640 can calculate a similarity between the created genetic map and the malware genetic map through the comparing process. The comparator 640 can determine whether the two genetic maps are similar to each other, on the basis of the similarity.

Also, the comparator 640 can compare the created genetic map received from the genetic map generator 620 with at least one normal file genetic map. The normal file genetic map can be received from the data base through the communication unit 650.

Furthermore, the comparator 640 can command the signature generator 630 to create a signature for the created genetic map, on the basis of the result of the comparison. For instance, when the result indicates that the target file is determined to include malware, the comparator 640 commands the signature generator 630 to generate a signature for the created genetic map of the target file. The signature created by the signature generator 630 can be transmitted to the client device 10 via the communication unit 650.

The communication unit 650 may transmit the created genetic map to the data base 40 and store the created genetic map in the data base 40, when the target file is determined to include malware. In addition, communication unit 650 may also transmit the created genetic map to the data base 40 and store the created genetic map in the data base 40, when the target file is determined to be a normal file.

Figure 5:
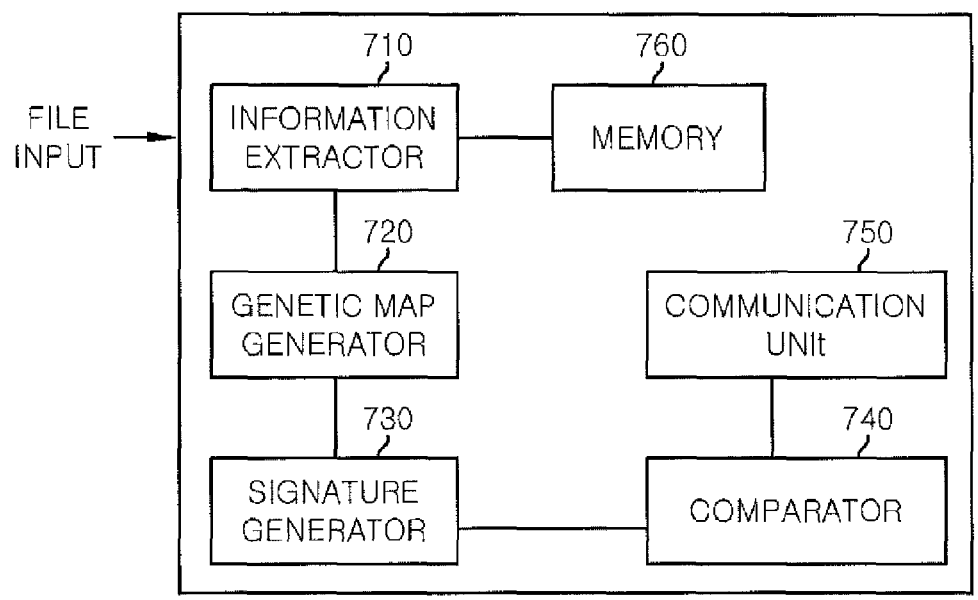
FIG. 5 is a block diagram showing a malware detection system in accordance with the fourth embodiment of the present invention.

FIG. 5 is a block diagram showing a malware detection system in accordance with the fourth embodiment of the present invention. The system of FIG. 5 may be performed on the client device 10 shown in FIG. 1.

The malware detection system in accordance with the fourth embodiment of the present invention includes an information extractor 710, a genetic map generator 720, a signature generator 730, a comparator 740, a communication unit 750 and a memory 760. The information extractor 710 and the genetic map generator 720 are the same as those of the system illustrated in FIG. 4. As such, the descriptions of the information extractor 710 and the genetic map generator 720 will be omitted to avoid overlapping those of FIG. 4.

The signature generator 730 derives a signature from the genetic map of the target file created by the genetic map generator 720. The derived signature is transmitted to the comparator 740. The comparator 740 compares the derived signature with at least one malware signature which are received from an external device, such as an analysis device 20, via the communication unit 750 or have been previously stored in the memory 760. The comparator 740 determines that the target file includes malware when the compared result indicates that the derived signature is substantially identical to the malware signature. Also, the comparator 740 can transmit information about the target file to the external device via the communication unit 750. As such, information about new malware can be transmitted to the external device and accumulated in the data base 40.

Moreover, the comparator 740 can compare the derived signature with at least one signature of the normal file which are received from the external device via the communication unit 750 or have been previously stored in the memory 760. When the compared result indicates that the derived signature is substantially identical to the normal file signature, the comparator 740 can determine the target file to be a normal file. In a different manner, if the compared result indicates that the derived signature is substantially identical to not only the malware signature but also the normal file signature, the comparator 740 can defer determining whether the target file includes malware or only normal code. In this case, the comparator 740 can inform, via the communication unit 750, the external device that it is impossible or too difficult to determine whether the target file includes malware or only normal code, so that the external device performs an accurate determination.

As described above, the malware detection method and system in accordance with the embodiments of the present invention can consider all the characteristics of a file in the detection of malware by using the genetic map. As such, the detection accuracy of the malware is rarely affected when any one among the characteristics of the file is varied. Therefore, a high detection accuracy of the malware can be maintained. Also, a plurality of mutated malware can be detected.

Moreover, the genetic map is uniformly created regardless of the characteristics of the file. As such, the genetic map is rarely affected with the configuration and content of the file. Accordingly, the malware detection can be systematically and uniformly executed.

While the invention has been shown and described with respect to the embodiments, it will be understood by those skilled in the art that various changes and modifications may be made without departing from the scope of the invention as defined in the following claims.

The invention claimed is:

1. A method performed on a computer for detecting whether a file includes malware, the method comprising:
   extracting static information of at least two predetermined items in the file;
   creating a genetic map for the file by alternating the extracted information into a previously set format;
   comparing the created genetic map with a previously stored malware genetic map to obtain a similarity between the created genetic map and the previously stored malware genetic map;
   determining that the file includes malware when the similarity is higher than a reference value relating to the malware;
   comparing the created genetic map with previously stored whitelist genetic map for a whitelist file to obtain another similarity between the created genetic map and the whitelist genetic map; and
   deferring said determining when said another similarity between the created genetic map and the whitelist genetic map is higher than another reference value related to the whitelist file.

2. The method of claim 1, wherein the created genetic map includes information representing non-existence of the information of one item among the predetermined items when the information of said one item does not exist in the file.

3. The method of claim 1, wherein, the information of said at least two predetermined items are extracted from a part of the file.

4. The method of claim 1, wherein the predetermined items include a branch distance which is included in a branch instruction within the file.

5. The method of claim 1, wherein the predetermined items are selected regardless of a kind of the file.

6. The method of claim 1, the method further comprising:
   storing the created genetic map in a data base, via a network, as a new malware genetic map when the file is determined to include malware, wherein the previously stored malware genetic map has been stored in the data base.

7. The method of claim 1, further comprising;
   storing created genetic map in a data base as a new whitelist genetic map of the whitelist file when said another similarity between the created genetic map and the whitelist genetic map is higher than said another reference value and when the similarity between the created genetic map and the previously stored malware genetic map is lower than said another reference value related to the whitelist file,
   wherein the whitelist genetic map has been previously stored in the data base.

8. The method of claim 1, wherein said additional comparing is performed when the similarity between the created genetic map and the previously stored malware genetic map is higher than the reference value related to the malware.

9. The method of claim 1, further comprising:
   deriving a malware signature from the created genetic map when the file is determined to include the malware; and
   transmitting the derived malware signature to another device.

* * * * *